United States Patent [19]
Hopkins

[11] Patent Number: 5,442,514
[45] Date of Patent: Aug. 15, 1995

[54] COMPUTER HAVING MOVABLE SHUTTER SELECTIVELY PROVIDING ACCESS TO STORAGE MEDIA RECEIVERS AND CORRESPONDING OPERATING SYSTEMS

[75] Inventor: Robert A. Hopkins, Basildon, United Kingdom

[73] Assignee: Amstrad Public Limited Company, Essex, United Kingdom

[21] Appl. No.: 178,299
[22] PCT Filed: May 14, 1993
[86] PCT No.: PCT/GB93/00998
 § 371 Date: Jan. 7, 1994
 § 102(e) Date: Jan. 7, 1994
[87] PCT Pub. No.: WO93/23852
 PCT Pub. Date: Nov. 25, 1993

[30] Foreign Application Priority Data
 May 14, 1992 [GB] United Kingdom ............... 9210370

[51] Int. Cl.[6] .................. G06F 1/16; H05K 5/02; B65D 43/20
[52] U.S. Cl. .................. 361/686; 361/683; 361/727; 364/708.1; 312/295; 220/345
[58] Field of Search .................. 312/223.2, 295; 220/345, 346; 70/14, 58; 364/708.1; 361/683-686, 724-727

[56] References Cited

FOREIGN PATENT DOCUMENTS

| 0389261A2 | 9/1990 | European Pat. Off. . |
| 3702821A1 | 8/1988 | Germany . |
| 9115781 U | 4/1992 | Germany . |
| WO87/02502 | 4/1987 | WIPO . |

*Primary Examiner*—Michael W. Phillips
*Attorney, Agent, or Firm*—Flynn, Thiel, Boutell & Tanis

[57] ABSTRACT

A dual compatible computer has first and second program retrieval means, for example of two disc drives or a disc drive and a games cartridge reader (12, 14) each dedicated to a respective operating system. A shutter (16) is slidable to expose one or the other of the retrieval means. Movement of the shutter switches on the CPU which is dedicated to the exposed retrieval means.

6 Claims, 3 Drawing Sheets

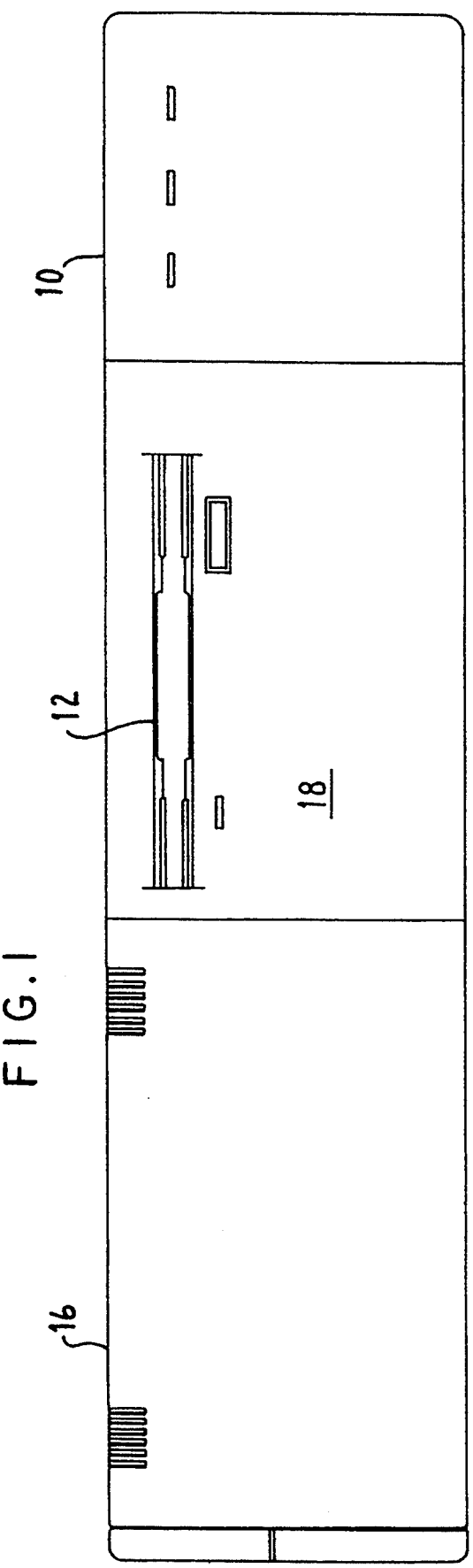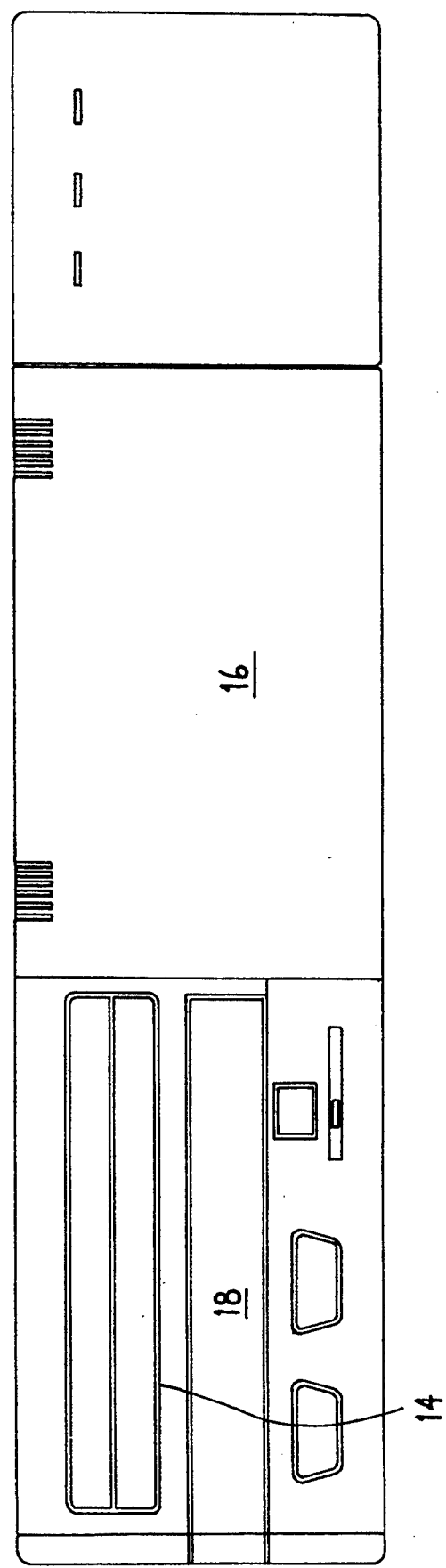

COMPUTER HAVING MOVABLE SHUTTER SELECTIVELY PROVIDING ACCESS TO STORAGE MEDIA RECEIVERS AND CORRESPONDING OPERATING SYSTEMS

This invention relates to computers and in particular to computers which are configured to be compatible with more than one format of operating software.

In order to enable a computer to operate on different operating software it may be necessary to provide two different disc drives or other mechanisms for loading programs with associated processing circuitry inside the computer. This gives rise to the possibility of the operator attempting to insert discs which are compatible with a first software type into the disc drive intended for discs formatted according to a second software type. This is clearly undesirable.

The invention aims to overcome the problem and, in its broadest terms, provides for only one of the drives or other loading mechanisms to be accessible at any one time.

More specifically, the invention is defined by the claims to which reference should be made.

In preferred embodiment of the invention a shutter is slidable between a first position in which a first disc drive or other loading mechanism is accessible but a second drive or other mechanism is not, and a second position in which the second drive is accessible but the first is not.

One or more of the disc drives may be replaced by a tape or cassette player, compact disc player, cartridge reader or other suitable device.

Although it is less likely that a user would attempt to insert, for example, a disc into a games cartridge drive, the possibility exists, especially as games facilities tend to be used by children. Embodiment of the invention prevent this from happening.

Preferably, in a preferred embodiment of the invention, two separate processors are provided. Where one of the CPUs is dedicated to running games programs. Movement of the shutter from one position to the other activates or deactivates the computer CPU associated with the games cartridge reader whilst leaving the CPU associated with the other drive activated.

An embodiment of the invention will now be described, by way of example, and with reference to the accompanying drawings in which:

FIG. 1 is a front view of a dual compatible computer embodying the invention and configured with a disc drive accessible;

FIG. 2 is a similar view to FIG. 1 with the a cartridge reader accessible;

FIGS. 1 and 2 show a computer Which may be configured to operate in two different manners, according to two different operating standards. For example, it may operate as a personal computer (PC) compatible with IBM (RTM) software and also as a games computer for running dedicated software.

Figure 3:
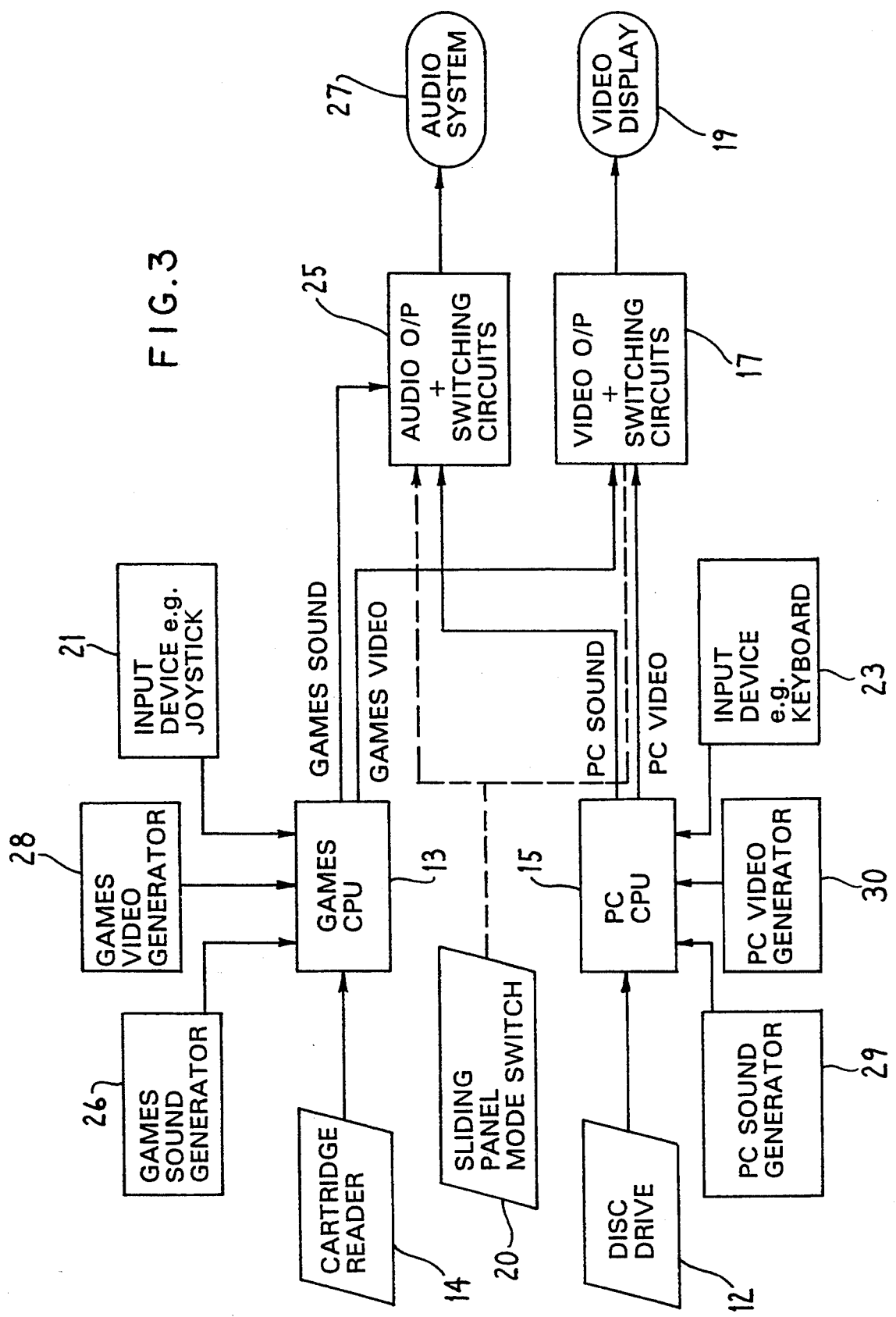
FIG. 3 is a block schematic diagram of the major hardware components of the computer.

The computer processing circuitry is located in a housing 10 and has a games cartridge reader 14 and a disc drive 12 (FIGS. 1, 2). The processing circuitry disc drive and the games cartridge are separate. Thus, each of the disc drive and the games cartridge reader has a separate dedicated CPU 13,15 (FIG. 3).

The unit is effectively two separate computers which share video and audio output circuit 17, 25 and a common video display 19 and audio system 27. Inputs to each CPU are provided, for example a joystick control 21, sound and video generators 26, 28 to CPU 13, and a keyboard 23, sound and video generators 29, 30 to CPU 15. A sliding shutter 16 slides between a first position (FIG. 1) in which the PC disc drive is exposed and is accessible, and a second position in which the games cartridge reader is exposed and is accessible for insertion of discs. When one of the disc drive and cartridge reader is accessible the other is inaccessible.

Figure 4:
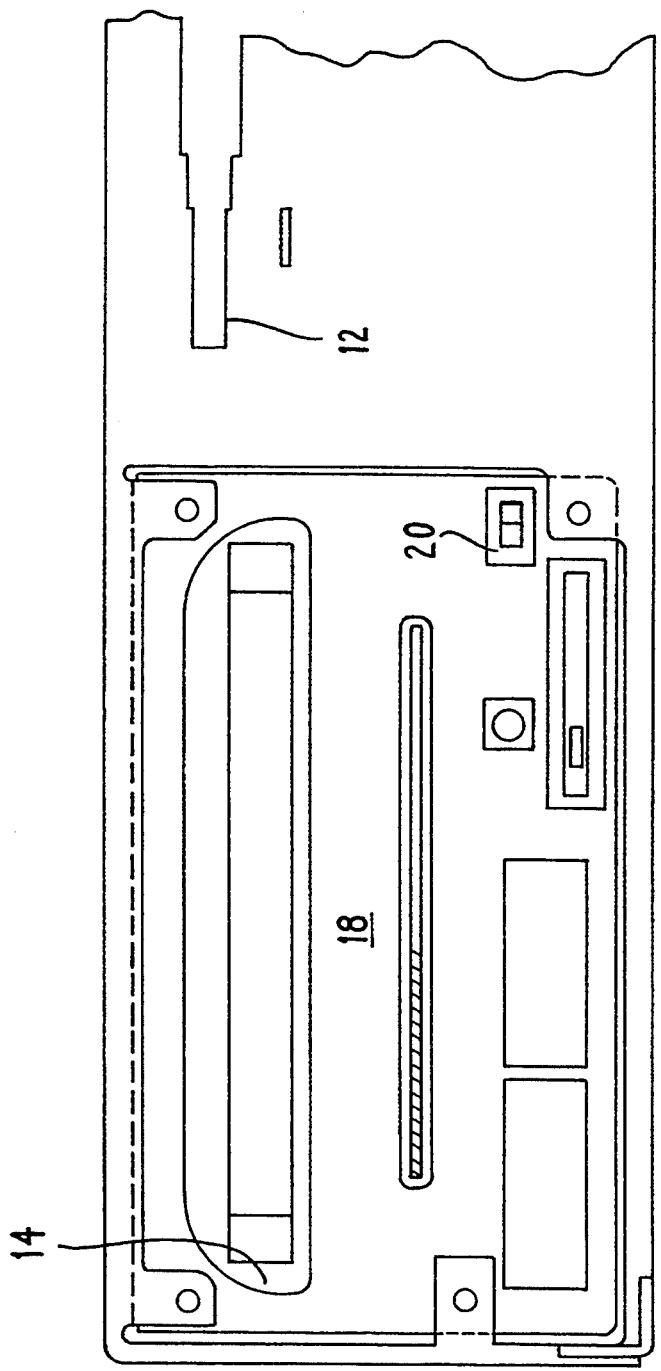
FIG. 4 is a partial front view with the shutter removed.
Figure 4A:
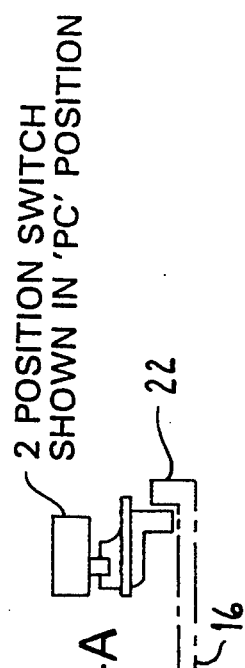
FIG. 4a is a view of the switch assembly of FIG. 4.

Referring additionally to FIGS. 4 and 4a a switch 20 is provided on the fascia 18 which is activated by the sliding door 16 to switch between the CPU dedicated to the one of the disc drive and games cartridge exposed. Thus, in FIG. 4, the switch is located under the games cartridge reader 14, although it could be under the disc drive 15. When the shutter 16 is moved from the FIG. 2 to the FIG. 1 position, the trailing wall 22 will move the two position switch to the left as shown in FIG. 4, enabling the CPU 15 (FIG. 3) coupled to the disc drive 12 for PC operation. When moved from the FIG. 1 to FIG. 2 position the opposite wall (not shown) will return the switch to the Games position. The PC CPU remains enabled at all times allowing processing of PC tasks while the games computer is running. However, the games CPU 13 is enabled and disabled according to the position of switch 20.

Various modifications to the embodiment described are possible. For example, the shutter need not be slidable but may be hinged. The disc drive and games cartridge reader may be arranged one on top of the other with the pivot axis of the shutter between the drives and catches provided to retain the shutter in position. Tape cassette mechanisms, compact disc players, or any other suitable program retrieval means may be used instead of one of disc drive and cartridge reader. Two identical disc drives, cartridge readers or other program retrieval means could be used where it is desired to use two different types of operating software. Additionally a single CPU with suitable addressing could be used instead of separate CPUs.

I claim:

1. A computing apparatus configured to operate in a manner compatible with two or more operating systems, comprising first means for receiving media on which are stored programs for the first operating system, second means for receiving media on which are stored programs for the second operating system, and further comprising a shutter movable between a first position in which the first receiving means is accessible for insertion of program bearing media and in which the second receiving means is inaccessible, and a second position in which the second receiving means is accessible and the first receiving means is inaccessible.

2. Apparatus according to claim 1, comprising a switch means activated by movement of the shutter to the first position to enable a processing means dedicated to the first operating system, and activated by movement of the shutter or to the second position to disable the processing means dedicated to the first system.

3. Apparatus according to claim 2, wherein the processing means dedicated to each of the first and second operating systems comprise separate processors.

4. Apparatus according to claim 1, wherein the shutter is slidable between the first and second positions.

5. Apparatus according to any of claims 1, wherein the first and/or second receiving means is a disc drive.

6. Apparatus according to claim 1, wherein one of the first and second operating systems configures the apparatus to operate as a PC and the other of the first and second operating systems configures the computer to operate as a games computer.

* * * * *

UNITED STATES PATENT AND TRADEMARK OFFICE
CERTIFICATE OF CORRECTION

PATENT NO. : 5 442 514
DATED : August 15, 1995
INVENTOR(S) : Robert Andrew HOPKINS It is certified that error appears in the above-indentified patent and that said Letters Patent is hereby corrected as shown below:

```
Column 2, line 64; change "or to the" to
                    ---to the---.
Column 3, line 3; change "to any of claims 1," to
                    ---to claim 1---.
```

Signed and Sealed this

Sixteenth Day of January, 1996

Attest:

BRUCE LEHMAN

*Attesting Officer*     *Commissioner of Patents and Trademarks*